UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

PROCESS OF MOLDING ARTICLES.

1,259,473.  Specification of Letters Patent.  Patented Mar. 19, 1918.

No Drawing. Original application filed December 2, 1909, Serial No. 531,000. Divided and this application filed May 25, 1917. Serial No. 170,991.

*To all whom it may concern:*

Be it known that I, LEO H. BAEKELAND, a citizen of the United States, residing at Yonkers, in the county of Westchester and State of New York, have invented certain new and useful Improvements in Processes of Molding Articles, of which the following is a specification.

In my prior United States patents and applications I have described several processes of forming objects consisting of the condensation products of phenols and formaldehyde, or containing such condensation products compounded with inert filling materials. For example, as described in my U. S. Patents Nos. 942,699 and 942,700, patented December 7, 1909, if a mixture of phenol or its homologues and formaldehyde or its polymers be heated, alone or in presence of catalytic or condensing agents, the formaldehyde being present in about the molecular proportion required for the reaction or in excess thereof, that is to say, approximately equal volumes of commercial phenol or cresylic acid and commercial formaldehyde, these bodies react upon each other and yield a product consisting of two liquids which will separate or stratify on standing. The lighter or supernatant liquid is an aqueous solution, which contains the water resulting from the reaction or added with the reagents, whereas the heavier liquid is oily or viscous in character and contains the first products of chemical condensation or dehydration. The liquids are readily separated, and the aqueous solution may be rejected or the water may be eliminated by evaporation. The oily liquid obtained as above described is found to be soluble in or miscible with alcohol, acetone, phenol and similar solvents or mixtures of the same. This oily liquid may be further submitted to heat on a water- or steam-bath so as to thicken it slightly and to drive off any water which might still be mixed with it. If the reaction be permitted to proceed further the condensation product may acquire a more viscous character, becoming gelatinous, or semi-plastic in consistence, and may even become solid and brittle when cold, again melting when gently heated. This modification of the product is insoluble or incompletely soluble in alcohol but soluble or partially soluble in acetone or in a mixture of acetone and alcohol. All such condensation products are hereinafter referred to as partial condensation products and may be subjected to further treatment as hereinafter described. By sufficient heating, any partial condensation product is transformed into a hard body, hereinafter referred to as the final product. This final product is unaffected by moisture, insoluble in alcohol and acetone, infusible, and resistant to acids, alkalis and almost all ordinary reagents. It is suitable for many purposes, and may be employed either alone or in admixture with other solid, semi-liquid or liquid materials, as for instance asbestos fiber, wood fiber, other fibrous or cellular materials, rubber, casein, lampblack, mica, mineral powders as zinc oxid, barium sulfate, etc., pigments, dyes, nitrocellulose, abrasive materials, lime, sulfate of calcium, graphite, cement, powdered horn or bone, pumice stone, talcum, starch, colophonium, resins or gums, slate dust, etc., in accordance with the particular uses for which it is intended, and in much the same manner as india rubber is compounded with the above-named and other materials to yield various valuable products. In compounding the condensation or dehydration product in this manner the desired materials are mixed with the same before submitting it to the final hardening operation.

I have found that the presence of certain organic substances in the final product may determine a softening action on the latter, which is especially pronounced at comparatively high temperatures. Such additions impart new and valuable properties to these bodies, in that they are rendered plastic or capable of welding under pressure, yielding thereby compact and coherent masses, bodies or articles, especially if the pressure be aided by heat. Such organic bodies as naphthalene, anthracene or other suitable fusible hydrocarbons having a relatively high boiling-point, anilin, phenols, or other phenolic bodies, pitch, asphaltum, cumarin, resin, other resinous matters, paraffin, and in general such substances as exert some solvent action, however slight, upon the initial or partial condensation products of phenols and formaldehyde and form therewith a solid solution, can be used for this purpose. The fact as above mentioned that such organic bodies persist in the final product and have a softening effect thereon is an indication that they form a so-called solid solution with this final product also.

The substances as described above may be added to the initial reacting chemicals, or they may be introduced at any time during the reaction. They may furthermore be used in conjunction with suitable condensing agents or suitable filling materials.

By the addition of the above-described bodies which facilitate the welding of the mass under pressure, it becomes possible to simplify considerably the molding of articles from the final condensation products of phenols and formaldehyde. Indeed, these condensation products can be formed by the simple application of heat, without the use of special precautions for avoiding the production of spongy or irregular masses, and whatever the shape of the final mass may be it can be easily introduced into suitable molds, preferably after being comminuted, and can then be pressed or consolidated into the desired shape. The latter operation is greatly facilitated by the use of temperatures exceeding 100° C., and preferably greatly exceeding this temperature, whereby the softening effect is increased.

By the term "phenols" in the present specification and claims I intend to designate not only ordinary phenol but its homologues or other phenolic bodies or mixtures thereof, which are equivalent to phenol for the purposes of this invention. Instead of formaldehyde, I may use the polymers of formaldehyde, or in general such substances as are able to engender formaldehyde in suitable condition.

In some cases it is sufficient simply to use an excess of phenolic bodies, so that after the reaction is over the final product contains an excess of such phenolic bodies, which thus impart the welding properties described above. Or again, the reaction may be started with the proper proportions of phenols and formaldehyde, but may be conducted in such manner that during the heating a large amount of formaldehyde is expelled or does not combine, thus producing a final product which contains an excess of uncombined phenolic body capable of acting as a softening agent, and rendering the mass capable of welding as above described.

This application is a division of my copending application Serial No. 531,000, filed December 2, 1909.

I claim:—

1. Process of making compact and coherent masses or articles containing a final infusible phenolic condensation product, which consists in forming a final infusible condensation product compounded with a material imparting to the mass the capability of welding, and consolidating fragments of the composition by causing surfaces thereof to unite or weld under the influence of heat and pressure.

2. Process of making compact and coherent masses or articles containing a final infusible phenolic condensation product, which consists in forming a final infusible condensation product compounded with a material imparting to the mass the capability of welding, subdividing the mass, and consolidating fragments thereof under the influence of heat and pressure.

In testimony whereof I affix my signature in presence of two witnesses.

LEO H. BAEKELAND.